United States Patent [19]
Court

[11] 3,835,386

[45] Sept. 10, 1974

[54] BINARY DATA COMMUNICATION APPARATUS

[75] Inventor: Frederick Charles Court, Lymington, England

[73] Assignee: The Secretary of State for Defence in Her Britannic Majesty's Government of the United Kingdom of Great Britain and Northern Ireland, London, England

[22] Filed: May 30, 1973

[21] Appl. No.: 365,112

[52] U.S. Cl. .................... 325/50, 178/68, 325/38 R, 325/137

[51] Int. Cl. ............................................ H04b 1/68

[58] Field of Search........... 178/66 A, 68; 325/38 R, 325/49, 50, 136–138; 332/45

[56] References Cited

UNITED STATES PATENTS 3,772,598 11/1973 Gerwen................................ 325/50

*Primary Examiner*—Albert J. Mayer
*Attorney, Agent, or Firm*—Cameron, Kerkam, Sutton, Stowell & Stowell

[57] ABSTRACT

Apparatus for the single side band transmission of binary data. The apparatus comprises a coder which converts the binary data sequence to a related code sequence, gate circuit means, a carrier signal generator and a band pass filter. The related code sequence and carrier signals are applied to the gate circuit means so that the related code sequence gates the carrier signals through to the output. The output of the gate circuit means therefor comprises bursts of carrier signals. The gate circuit means are further arranged so that alternate bursts of carrier signal are in anti-phase relationship with each other. These carrier signal bursts are applied to a band pass filter. The response of the filter is such that when a half bit duration burst is applied to it the output is a burst of oscillation of twice the bit duration rising from zero amplitude to a maximum in the first bit period and falling again to zero in the second bit period. The filter's output is an amplitude and dipolar angle modulated (ADAM) signal which only occupies a single side band and can be detected at the receiver by a simple envelope detector.

5 Claims, 6 Drawing Figures

BINARY DATA COMMUNICATION APPARATUS

The present invention relates to data communication apparatus and in particular to binary data communication apparatus.

In order to communicate binary data it is necessary to employ a transmitter with a transmission bandwidth at least as wide as a bandwidth of the binary data. The binary data can be transmitted by conventional amplitude modulation of the carrier wave with a consequent penalty of the wide bandwidth and low power efficiency inherent in such a mehod of transmission. If single side-band suppressed carrier modulation is used to transmit the binary data in an effort to reduce the transmitted bandwith to that of the data, the large direct current component of the original binary data frequency spectrum is lost and is not present in the received waveform at the receiver. Because of this simple envelope detection at the receiver is not possible and for this reason known single side-band (SSB) binary data transmission systems employ coherent detection. Known SSB binary data transmission systems therefore, suffer from two disadvatnages:

a. Low frequency distortion due to isolation of one sideband and b. Distortion produced by carrier reinsertion for coherent detection at the receiver.

Standford in proceedings of the IEE volume 114 No 12, December 1967, has described a method and apparatus for compensating for this low frequency distortion and the distortion due to carrier reinsertion. Kretzmer in BSTJ Volume XLV No 5, May/June 1966, describes partial response technique for achieving SSB transmission. The idea of using SSB transmission in analogue form in such a manner as to facilitate demodulation by envelope detection has been widely investigated, but the complexity of such systems has proved considerably greater than those employed for conventional amplitude modulation.

It is an object of the present invention to provide apparatus for communication by single side-band modulation, with a pre-processed binary data sequence so as to allow the original binary data sequence to be recovered by simple signal envelope detection. It is a further object of the invention to provide such apparatus in a form which is relatively inexpensive and simple to construct and employs known circuit techniques.

According to the present invention there is provided telecommunications apparatus including coding means for converting a binary data sequence into a related code sequence, the binary data sequence comprising one-signals and zero-signals all of a predetermined bit duration, the related code sequence representing the zero-signals by a mean voltage level and the one-signals by pulses of half the predetermined bit duration; and, an arrangement for applying the said related code sequence and a source of carrier signals to a gate circuit, the output of said gate circuit being connected to the input of a single side-band filter, the output signals from the gate comprising bursts of carrier signal corresponding to one-signals of the related code sequence, each burst being in anti-phase relationship with the proceeding burst.

In one form of the invention the coding means is a three-level encoder which converts the binary data sequence to a related code in which each one-signal produced has the oppostie polarity to the preceding one-signal. Only one gate circuit is used in this form of the invention. Each one-signal from the three-level encoder opens the gate of the gate circuit for a half bit duration to allow the carrier-wave or an anti-phase version of it (depending on the polarity of the one-signal) to be applied to the side-band filter. Therefore the output from the gate circuit in this form is a ON/OFF amplitude and phase modulated double side-band suppressed carrier signal in which the alternate positive and negative polarity of the related code one-signals have become bursts of the carrier wave, alternate bursts having $\pi$ radians phase shift with respect to the preceding burst. The averaging of these alternate phase transitions produces a carrier suppression effect.

In another form of the invention the coding means comprises a return-to-zero coder which converts one-signals of the binary data sequence to one-signals all of one polarity and of half bit duration in a related code sequence and leaves the zero-signals unchanged. The output of the return-to-zero coder is applied via a switch to one of two gate circuits. The switch is operated by the one-signals of the related code sequence so as to apply alternate one-signals at the output of the return-to-zero coder to one gate circuit and the remaining alternate one-signals to the other gate circuit. Carrier-wave signals in anti-phase with each other are applied to the two gate circuits respectively. A one-signal applied to either gate opens it for a half bit duration and allows the corresponding carrier-wave signal to pass to the output of that gate. The outputs of the two gate circuits are combined in an adder circuit, the output of which in operation will be the required suppressed carrier ON/OFF amplitude and phase modulated signal, which is then applied to the SSB filter.

In another form of the invention the coding means again comprises a return-to-zero coder which converts one-signals of the binary data sequence to one-signals all of one polarity and of half bit duration in the related code sequence and leaves the zero-signals unchanged. The output of the return-to-zero coder is applied simultaneously to a bistable circuit and a gate circuit. The polarity of the pulse in the output of the bistable circuit determines the relative phase of the carrier-signal oscillations. Oscillations triggered by negative pulses at the output of the bistable are in anti-phase to those oscillations triggered by positive pulses at the output of the bistable. These oscillations are applied to a gate circuit. The gating of these signals to the input of the single side-band filter is controlled by the signals at the output of the return-to-zero coders. The resultant input to the filter will be the required suppressed carrier ON/OFF amplitude and phase modulated signal.

The single side-band filter is a band-pass filter with a linear phase delay versus frequency characteristic and can be chosen to pass either the upper or the lower side-band of the signal from the gate circuit. The response of the filter to a half bit duration burst of the carrier-wave in the signal is a burst of oscillation of twice the bit duration, the phase of which either varies linearly from 0 to $2\pi$ or varies linearly from $\pi$ through $2\pi$ to $\pi$ relative to the carrier signal, depending on the phase of the carrier-wave in the burst. In either case the amplitude of the signal at the output of the filter when it is subjected to a half bit duration burst of the carrier-wave rises from zero to a maximum during the first bit duration and falls to zero during the next bit duration. In the combined output of the filter the phase changes commence from 0 for alternate binary one-signals in the original binary data sequence and from $\pi$ for the remaining alternate binary one-signals. This form of the modulated signal has been called dipolar angle modulation to distinguish it from direct current bipolar coding. In this case, due to the filter response described above, the signal for transmission combines amplitude modulation with dipolar angle modulation and the combined modulation is therefore called amplitude and dipolar angle modulation and will be referred to hereinafter as ADAM.

A suitable receiver for binary data processed and transmitted by the apparatus according to the invention comprises simply a signal envelope detector for receiving the transmitted information, a low-pass filter connected to the output of the envelope detector, a slicer circuit connected to the output of the low-pass filter and a direct current (dc) pulse shaper connected to the output of the slicer circuit, the output of the dc pulse shaper being the required reproduction of the binary data sequence.

Embodiments of the invention will now be described by way of example only and with reference to the accompanying diagrammatic drawings of which FIG. 1 is a block schematic circuit diagram of a single sideband binary data transmission apparatus.

Figures 1, 6:
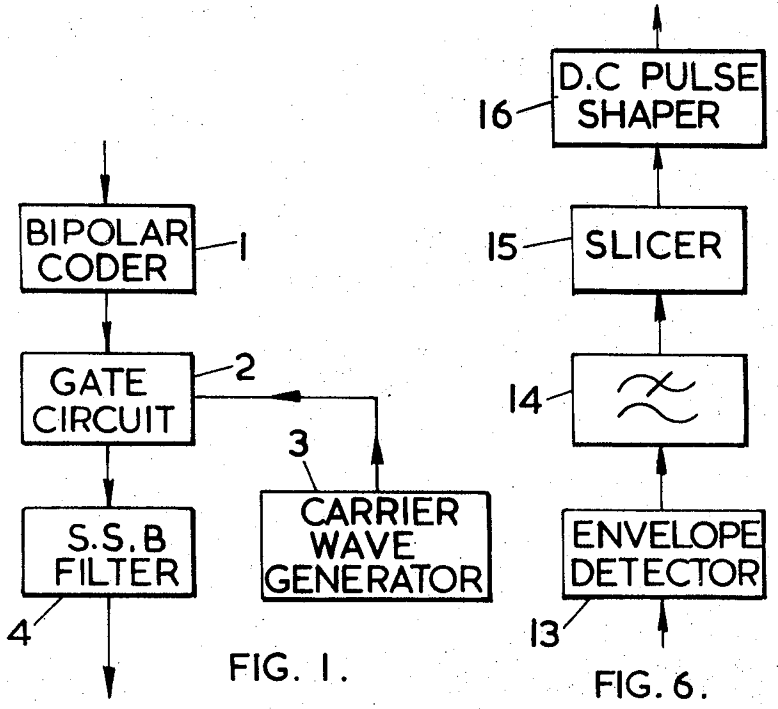
Figure 2:
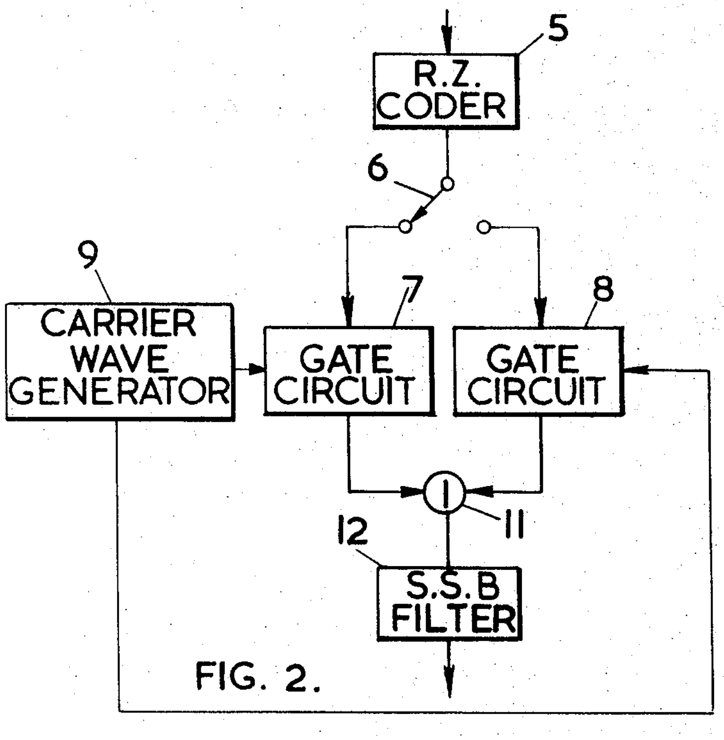
FIG. 2 is a block schematic circuit diagram of an alternate form of the apparatus shown in FIG. 1.
Figure 4:
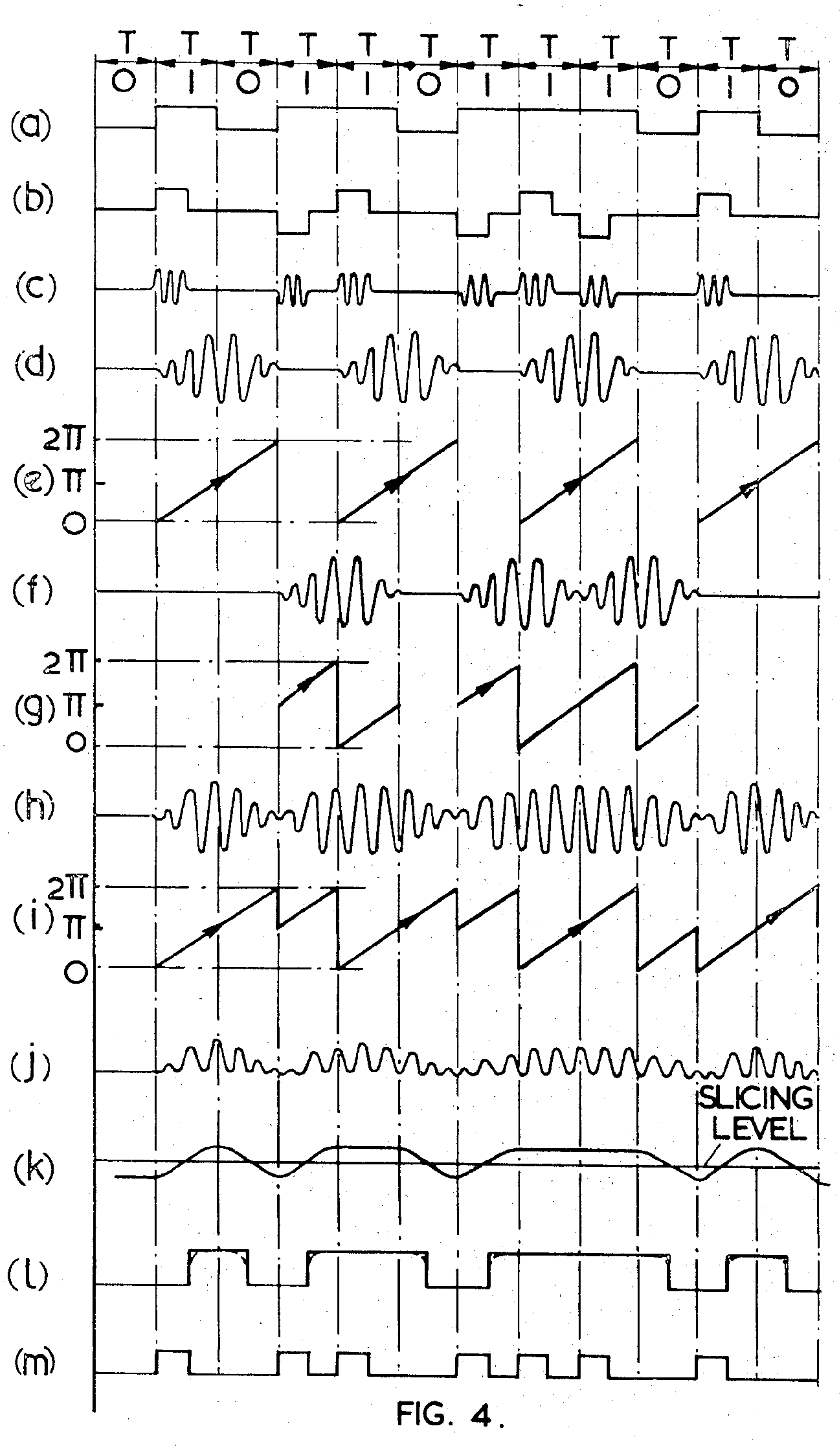

FIGS. 4(*a*) to FIGS. 4(*m*) are graphical representations of typical waveforms at various points in the circuits of FIGS. 1, 2 and 6 when in operation.

Figure 3:
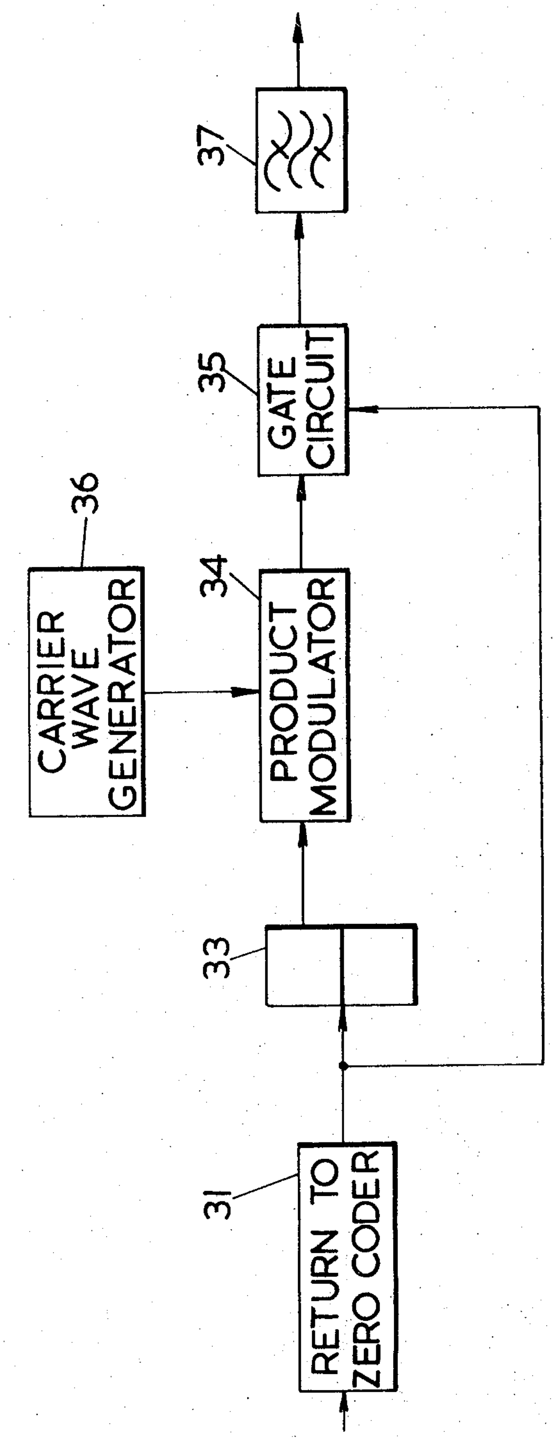
FIG. 3 is a block schematic circuit diagram of another alternative form of the apparatus shown in FIG. 1.
Figure 5:
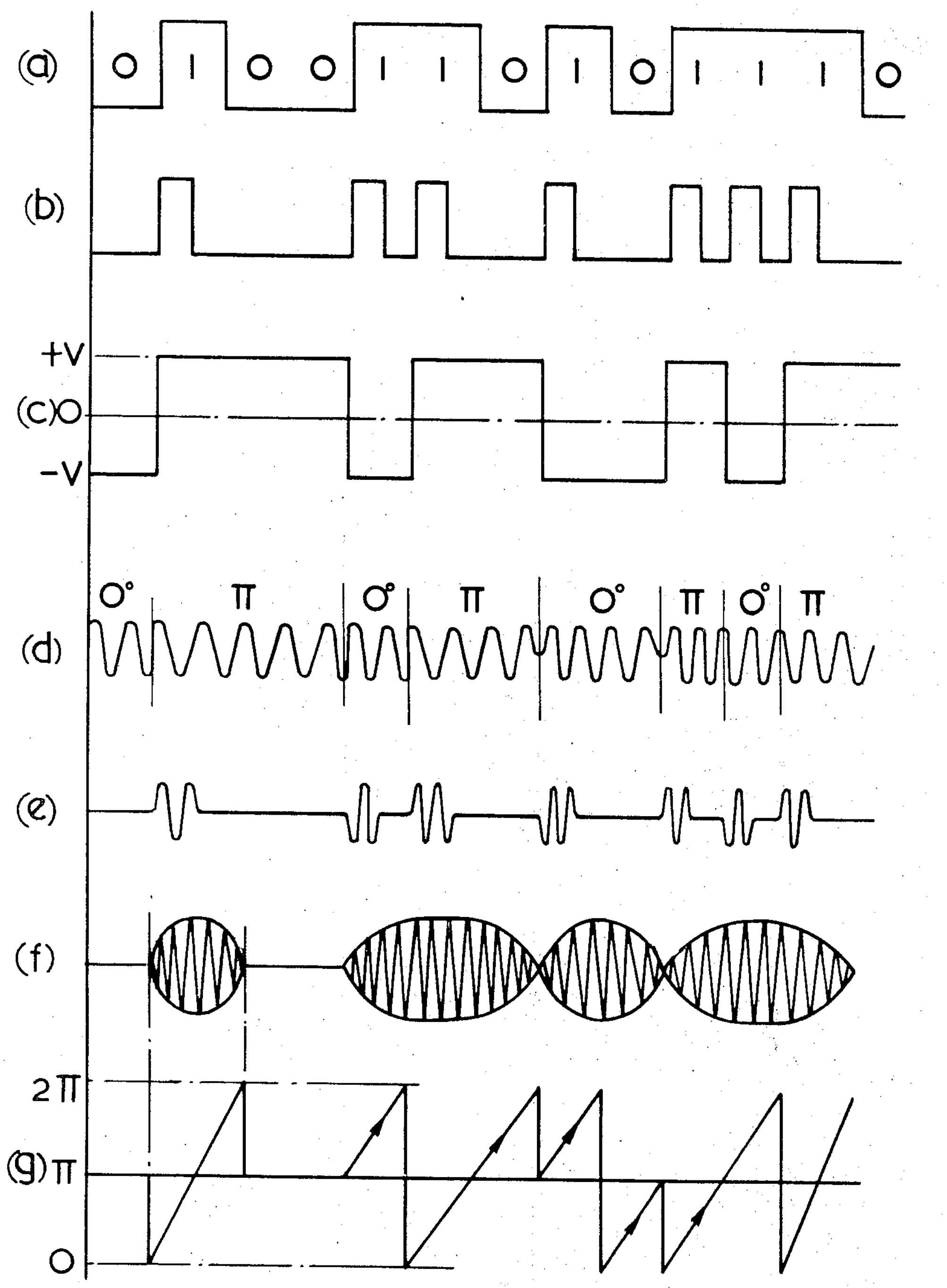

FIGS. 5(*a*) to FIGS. 5(*g*) are graphical representations of typical waveforms at various points in the circuit of FIG. 3.

FIG. 6 is a block schematic circuit diagram of an envelope detecting receiver circuit suitable for use in cooperation of the transmission apparatus shown in FIGS. 1, 2 or 3.

In FIG. 1 a three level encoder 1 has an input connected to a source of binary data signals (not shown) and an output connected to one input of a gate. circuit 2. The encoder 1 is a circuit of the type described by E R Kretzmer (BSTJ Volume XLV No 5 May-June 1966) for example, and in which a zero-signal in the original binary data sequence applied to it is converted to a zero-signal in the output code sequence, but the one-signals in the original data sequence are successively converted to a +1 and a −1 signal in the output code sequence, each of the output code signals being only of half bit duration with respect to the input one-signal. A further input of the gate circuit 2 is connected to receive signals from a carrier-wave generator 3. The gate circuit produces an output signal which is effectively the product of carrier-wave frequency and the bipolar code applied to its inputs. Thus, when the encoder 1 produces a zero-output the output of the gate circuit is also at a zero or mean level, when the encoder produces a +1 output the output of the gate circuit is a burst of the carrier wave frequency of half bit period duration and when the encoder 1 produces a −1 output the output of the circuit 2 is a similar burst of carrier-wave frequency also of half bit duration but of opposite phase. The output of the gate circuit 2 is connected to a conventional single side-band filter 4. The single side-band filter 4 is a band-pass filter whose bandpass is chosen to pass either the upper sideband or the lower side-band of the modulated signals. The band-pass filter 4 for the special purposes of this invention should have similar response characteristics to an ideal band-pass filter with a rectangular response versus frequency characteristic and a linear phase delay versus frequency characteristic over the passband. It may, for example, be an 8-pole band-pass Chebyshev filter. It should have a time response such that if a pulse of duration T/2 seconds is applied to it then the output pulse of the filter should be 2T seconds long with its maximum amplitude point occurring T seconds after application of the pulse. The output of the single side-band filter 4 is connected to conventional transmitter circuits (not shown) and thence to an aerial (not shown).

In operation a binary data sequence for instance as shown in FIG. 4(*a*) comprising a sequence of one-signals and zero-signals is applied to the input of the encoder 1 from the data source (not shown). The duration of each bit of the sequence is T seconds. The encoder 1 operates as described above to produce zero-signals from zero input signals of the binary data sequence and one-signals of T/2 duration from each of the one-signals of the binary data sequence, successive one-signals of the coded signal being of opposite sign. Thus the output of the encoder 1 for the binary data sequence shown in FIG. 4(*a*) at its input is that shown in FIG. 4(*b*). Each one-signal applied from the encoder 1 to the gate circuit 2 produces a burst of the carrier-wave frequency as described above. However, successive bursts of the carrier-wave signal will be of opposite phase. The output of the gate circuit 2 for the input of signals from the encoder 1 as shown in FIG. 4(*b*) is therefore as shown in FIG. 4(*c*). Because of the phase changes between consecutive bursts of the carrier-wave, the carrier-wave frequency will appear effectively suppressed in any anlysis of the output signal made over an interval in which an even number of one-signals or a large number of one-signals, have been coded. Each burst of the carrier wave frequency is of T/2 duration. Each burst of the carrier-wave frequency applied to the band-passfilter 4, will produce an output signal from the filter which increases in amplitude to a maximum at time T seconds after application of the burst to the input of the filter and decreases to zero in a further time T seconds thereafter. Furthermore the phase of the output signal of the filter relative to the phase of the input carrier signal will change linearly over the total time 2T seconds. Therefore the output of the band-pass filter 4 for each of the alternate, for example, reference phase bursts of the carrier wave signal applied to its input, is as shown in FIG. 4(*d*) whereas the output of the filter 4 for the bursts of the carrier wave signal in anti-phase to the reference bursts is as shown in FIG. 4(*f*) where reference phase bursts represent positive one-signals in the coded signal, and anti-phase bursts represent −1 signals in the coded signal in FIG. 4(*b*). The phase change over the time period of each of the output signals of the filter 4 for reference phase bursts applied to its input is shown in FIG. 4(*e*) to increase linearly from zero to 2 $\pi$ whereas the phase change over the time period of the output signal of filter 4 for anti-phase signals at its input is as shown in FIG. 4(*g*) to vary linearly from $\pi$ through 2 $\pi$ to $\pi$. The combined output of the filter is therefore an ADAM signal as shown in FIG. 4(*h*). It will be seen that this combined signal though superficially resembling a conventional amplitude modulated carrier wave is in fact a combination of amplitude modulated and angle modulated suppressed carrier signals whose envelope and zero crossing represent the original binary data sequence. FIG. 4(*i*) shows the phase changes within the combined signal of FIG. 4(*h*).

It is this phase and amplitude response of the filter to each pulse of the coded signal shown in FIG. 4(*b*) that leads to the ADAM signal of FIG. 4(*h*) which can then be transmitted by the conventional transmitter circuits and the aerial (not shown) to be received by a conventional signal envelope detecting receiver such as that shown in FIG. 6.

In FIG. 2 an alternative form of modulation apparatus is shown. It includes a return-to-zero coder 5 having an input for connection to a source of binary data signals (not shown) and an output for connection to a switch 6. Each one-signal in the coded sequence applied to the return-to-zero coder 5 is converted to a one-signal which is of half the duration of the input one-signal. Each one-signal in the coded sequence operates the switch 6 such that odd numbered one-signals are fed to a gate circuit 7 and even numbered one-signals are fed to a gate circuit 8. A carrier-wave generator 9 applies a carrier-wave to another input of the gate circuit 8 and an anti-phase version of the carrier-wave signal to another input of the gate circuit 7. The outputs of the gate circuits 7 and 8 are fed to separate inputs of an OR-gate 11. The output of the OR-gate 11 is connected to the single side-band filter 12 and the output of this filter is connected to conventional transmission circuits and aerial (not shown). The filter 12 is of the type described in the apparatus of FIG. 1 with reference to the filter 4.

In operation a binary coded data sequence, for instance as shown in FIG. 4(*a*), is supplied to the input of the return-to-zero coder 5. As explained above the one-signals at the input of the return-to-zero coder 5 are converted to one-signals of half bit duration but same polarity, whereas the zero-signals at the input remain zero signals at the output of the return to zero coder 5. The output of the coder 5 for the sequence of binary data shown in FIG. 4(*a*) applied to its input is as shown in FIG. 4(*m*). Successive one-signals in the output of the return-to-zero coder 5 are fed to the different gate circuits 7 and 8 respectively by the switch 6. It will be seen that the combined output of the OR-gate 11 is a sequence of bursts of the carrier-wave and zero level signals in which consecutive bursts of the carrier wave will have opposite relative phases. The output signals of the OR-gate 11 are therefore, similar to the output signals of the gate circuit 2 of FIG. 1 and for the applied binary data sequence shown in FIG. 4(*a*) will therefore also be shown as in FIG. 4(*c*). The signal supplied to the input of the single side-band filter 12 of FIG. 2 are therefore the same as the signals applied to the input of the single side-band filter 4 in FIG. 1. Hence the output of the filter 12 as explained above with reference to FIG. 1 will be an ADAM signal, the envelope and zero crossings of which correspond to the original binary data sequence and can therefore be detected in a conventional signal envelope detecting receiver, for example as shown in FIG. 6.

In FIG. 3 another form of ADAM transmitting circuitry is shown. A return-to-zero-coder 31 has an output connected to the normal input of a bistable circuit 33 and to an enabling input of a gate circuit 35. The bistable circuit 33 has a changeover output which is connected to a first input of a product modulator 34. The carrier wave oscillator 36 has an output connected to a second input of the product modulator 34, the output of which is connected to a signal input of the gate circuit. The product modulator 34 produces an output signal which is effectively the product of the carrier-wave frequency and encoded binary sequence applied to its first and second input respectively. The gate circuit 35 has a signal output connected to the input of a band-pass filter 37. The output of the filter 37 is connected to an aerial (not shown) via conventional transmitter circuits (not shown).

In operation a binary data sequence comprising one-signals and zero-signals each of a predetermined bit duration and a typical example of which is shown in FIG. 5(*a*), is applied from a binary data source (not shown) to an input line of the return-to-zero coder 31. Each one-signal in the binary data sequence applied to the coder 31 is converted to a one-signal at its output which is half the duration of the input one-signal but of the same polarity. Each zero-signal in the binary data sequence applied to the input of the coder 31 results in a equal duration zero signal at its output. The output of the coder 31 when the binary sequence shown in FIG. 5(*a*) is applied to its input is input is thus the return-to-zero sequence as shown in FIG. 5(*b*). This output sequence is applied to the bistable 33 and simultaneously to the gate circuit 35.

Each positive going edge of a one-signal applied to the bistable 3 from the return-to-zero coder 31 causes the bistable to change state so that the signal at its output either changes from a positive to a negative direct current voltage or vice versa. The signal at the output of the bistable 33 for the binary sequence shown in FIG. 5(*b*) applied to its input is therefore as shown in FIG. 5(*c*). The binary sequence shown in FIG. 5(*c*) is an encoded form of the binary sequence shown in FIG. 5(*a*).

A positive direct current voltage applied to the input of the product modulator and the bistable 33 produces a burst of carrier-wave from the oscillator 36 at its output, whereas the negative direct current voltage applied to the input produces a burst of the carrier-wave in anti-phase that produced another positive voltage. The output of the product modulator 34 is therefore a sequence of bursts of the carrier-wave phase modulated in a manner corresponding to the encoded binary data sequence. The output of the produce modulator 34 fo the binary data sequence shown in FIG. 5(*a*) is therefore as shown in FIG. 5(*d*).

The gate circuit 35 only allows the signals from the product modulator 34 to be passed to the band-pass filter 37 whenever a one-signal is applied to its enabling input. The signal shown in FIG. 5(*d*) is therefore gated by the return-to-zero sequence shown in FIG. 5(*b*) and the resulting signal applied to the input of the band-pass filter 37 is as shown in FIG. 5(*e*), that is to say a sequence of bursts of the carrier-wave, consecutive bursts being of opposite phase and each burst being of half the duration of a bit of the original binary data sequence. The signal at the output of the filter 37 is an ADAM signal as described previously and is shown at FIG. 5(*f*). FIG. 5(*g*) is a plot of the linear phase changes of the ADAM signal with respect to the carrier signal and illustrates why the amplitude of the signal remains substantially constant in those case where the responses of the filter 37 to successive bursts of the carrier-wave overlap. It is this property of the ADAM signal which enables it to be received and detected by conventional envelope detection circuits.

The typical envelope detecting receiver circuit suitable for use with the transmitters shown in FIG. 1, 2 or 3 is shown in FIG. 6, includes an envelope detector 13 having an input connected to a receiver aerial (not shown) and an output connected via a low-pass filter 14 and a slicer circuit 15 to a pulse shaper 16. When an ADAM signal such as that shown in FIG. 4($h$) is received at the input of the detector 13 of FIG. 6 the output of the envelope detector 13 will be a rectified version of that waveform as shown in FIG. 4($j$). The rectified signals are applied to the low-pass filter 14 and the output of the filter 14 will correspond to the envelope of the rectified signals as shown in FIG. 4($k$). The rectified envelope signals are then sliced at an appropriate level by the slicer circuit 15, following an output as represented by the dotted line in FIG. 4($l$). The sliced signal is then applied to a pulse shaper 16 which squares the resultant pulses, for example as shown by the full lines in FIG. 4($l$). it will now be seen that the output of a pulse shaper 16 corresponds exactly to the original binary data sequence of FIG. 4($a$) which was required for transmission at the transmitter of either FIG. 1, 2 or 3.

Many variations and modifications of the above embodiments will now suggest themselves to those skilled in the art.

A reference signal at the carrier-wave frequency could be transmitted with the output of single sideband filters 4, 12 and 7 of FIGS. 1, 2 and 3; direct phase comparison between the reference signal and the carrier wave frequency in the received ADAM signal produces a three level signal. This can be compared with the three level coded signal derived from the output and receiver circuit shown in FIG. 6, which provides a means for detecting errors in the transmission of the data, since most errors are unlikely to affect both methods in the same way. It is however estimated that errors of the order of $1:10^5$ for a normalised signal-to-noise ratio of 15 db are to be expected with the system. A reinserted carrier-wave could also be used after rectification at the receiver as a variable dc reference threshold for amplitude detection of the binary envelope transitions or as an automatic gain control with a fixed amplitude threshold reference for detection purposes. In a practical arrangement where at any station there will be a transmitter of the type shown in FIG. 1, FIG. 2 or FIG. 3 together with a receiver such as that shown in FIG. 6. The reference frequency of course need not be transmitted but can be made available for phase comparison purposes at the receiver from the local carrier wave generator in the transmitter. Alternatively, the carrier-wave frequency can be derived from the ADAM signal received at the receiver. It is to be emphasised that the transmission of a carrier-wave reference frequency is not essential for signal envelope detection in the system described but it can be used to improve error performance in the presence of noise under certain conditions when used as an amplitude and phase comparison reference at the receiver. Because the transmission apparatus described above is a single side-band transmission apparatus it necessarily gives a bandwidth utilisation equal to that of the original binary data sequence and that with a system complexity no greater than that of a conventional amplitude modulation system. The coding means need not produce one-signals of exactly half the duration of one-signals in the original binary data sequence, but departure from this figure results in a deterioration of the ADAM signal produced and may make resolution of crossing points difficult and lead to errors in the detected signal.

I claim:

1. Telecommunications apparatus for single sideband transmission of a binary data sequence which includes signals of a first kind and signals of a second kind, each signal being of a predetermined bit duration, comprising coder means for converting the binary data sequence to a related. code sequence, a carrier signal generator, gate circuit means connected to receive the said related code sequence from the coder means and to receive carrier wave-signals from the said carrier-wave signal generator, and arranged to operate on receipt of each signal representing the signals of the said second kind in the binary data sequence such that a burst of the carrier-wave signal is produced at the output of the gate circuit means and such that successive bursts of the carrier signals are in antiphase; a bandpass filter connected to the output of the gate circuit means and having frequency and amplitude response characteristics such that a half bit duration burst of carrier-wave signal applied at its input produces an output signal of twice the bit duration which rises from zero amplitude to a maximum amplitude in a time equal to the first bit duration and falls to zero amplitude again in a time equal to a further bit duration.

2. Telecommunications apparatus as claimed in claim 1 wherein the said coder means comprises a three level coder which is arranged to operate upon the signals representing the said first kind in the binary data sequence to produce a mean voltage level for the predetermined bit duration, and to operate on signals representing the second kind in the binary data sequence to produce corresponding pulses, successive pulses being of opposite polarity with respect to the said mean voltage level and each pulse being of half the predetermined bit duration, and wherein the polarity of each pulse determines the phase of the burst of carrier-wave signals applied to the bandpass filter.

3. Telecommunications apparatus as claimed in claim 1 wherein the said coder means comprises a return-to-zero coder which is arranged to operate on signals representing the first kind in the binary data sequence such that they are unchanged and to operate upon the signals representing the said second kind in the binary data sequence such that they are converted to equal amplitude pulses of half bit duration and of the same polarity with respect to the unchanged signals.

4. Telecommunications apparatus as claimed in claim 3 wherein the gate circuit means comprises, switch means having an input connected to the coder means for receiving the related code sequence and operative to direct successive pulses representing signals of the said second kind to different ones of two outputs of the switch;

two gate circuits each connected to a separate one of the outputs of the switch, and each connected to receive carrier-wave signals from the said carrier-wave signal generator, the carrier-wave signals received by one gate circuit being in antiphase relationship to the carrier-wave signals received by the other gate circuit, summing circuit means connected to receive signals from outputs of the gate circuits for producing a combined sequence of antiphase bursts of carrier signals corresponding to the sequence of pulses representing the signals of the said second kind applied to the said switch means.

5. Telecommunications apparatus as claimed in claim 3 wherein the said gate circuit means comprises, a bistable circuit connected to the output of the said return-to-zero coder and responsive to the leading edge ofthe pulses in the related code sequence, a first gate circuit having one input connected to an output of the bistable circuit and another input connected to the said carrier signal generator and operative such that the phase of the carrier signal bursts in its output is determined by the polarity of the pulses produced by the bistable, a second gate circuit having one input connected to the output of the return-to-zero coder and a further input connected to the output of the first gate circuit and having an output connected to an input of the single side-band filter.

* * * * *

PO-1050
(5/69)

UNITED STATES PATENT OFFICE
CERTIFICATE OF CORRECTION

Patent No. 3,835,386 Dated September 10, 1974

Inventor(s) Frederick Charles Court

It is certified that error appears in the above-identified patent and that said Letters Patent are hereby corrected as shown below:

Cover page, after item [21] insert:
--[30] Foreign Application Priority Data
May 31, 1972 Great Britain 25490/72.
Dec. 11, 1972 Great Britain 56999/72.--.

Col. 10, line 3, "ofthe" should read --of the--.

Signed and sealed this 7th day of January 1975.

(SEAL)
Attest:

McCOY M. GIBSON JR.
Attesting Officer

C. MARSHALL DANN
Commissioner of Patents